(12) United States Patent
Yoshida

(10) Patent No.: US 9,921,573 B2
(45) Date of Patent: Mar. 20, 2018

(54) SLICE IMAGE CREATION DEVICE, THREE-DIMENSIONAL PRINTING SYSTEM AND SLICE IMAGE CREATION METHOD

(71) Applicant: Roland DG Corporation, Hamamatsu-shi, Shizuoka (JP)

(72) Inventor: Makoto Yoshida, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 101 days.

(21) Appl. No.: 15/226,959

(22) Filed: Aug. 3, 2016

(65) Prior Publication Data
US 2017/0038765 A1    Feb. 9, 2017

(30) Foreign Application Priority Data

Aug. 7, 2015   (JP) .................................. 2015-157092

(51) Int. Cl.
| | |
|---|---|
| *G06F 19/00* | (2011.01) |
| *G05B 19/4097* | (2006.01) |
| *B33Y 70/00* | (2015.01) |
| *B29C 67/00* | (2017.01) |
| *B33Y 10/00* | (2015.01) |
| *B33Y 30/00* | (2015.01) |
| *B33Y 50/02* | (2015.01) |

(52) U.S. Cl.
CPC ...... *G05B 19/4097* (2013.01); *B29C 67/0062* (2013.01); *B29C 67/0088* (2013.01); *B33Y 70/00* (2014.12); *B33Y 10/00* (2014.12); *B33Y 30/00* (2014.12); *B33Y 50/02* (2014.12); *G05B 2219/35012* (2013.01)

(58) Field of Classification Search
CPC ...... G05B 19/4097; G05B 2219/35012; B33Y 70/00; B33Y 10/00; B33Y 30/00; B33Y 50/02; B29C 67/0062; B29C 67/0088
See application file for complete search history.

(56) References Cited

U.S. PATENT DOCUMENTS

| | | | |
|---|---|---|---|
| 6,259,962 B1 | 7/2001 | Gothait | |
| 6,654,656 B2* | 11/2003 | Kesavadas | ............ B29C 64/386 700/119 |
| 2015/0269282 A1* | 9/2015 | Nelaturi | .................. G06F 17/50 700/98 |

FOREIGN PATENT DOCUMENTS

JP        2003-535712 A    12/2003

* cited by examiner

*Primary Examiner* — Mark Connolly
(74) *Attorney, Agent, or Firm* — Keating & Bennett, LLP

(57) ABSTRACT

In a slice image creation device, a peeling processor performs peeling on a peeling line segment in a circulation direction of the peeling line segment. When the peeling reaches an intersection at which line segments of contours cross each other, an intersection information acquisition processor acquires intersection information including an intersection angle defined at the intersection by the peeling line segment and each candidate line segment connected to the intersection in a direction that is the same as the circulation direction of the peeling line segment. A transfer processor sets one of the candidate line segments that has the smallest intersection angle as the line segment to which the peeling is going to be transferred next from the peeling line segment at the intersection. A creation processor sets the line segments on which the peeling has been performed continuously as one generated contour and divides a target slice model into a printing region and a non-printing region based on the generated contour to create a target slice image.

11 Claims, 12 Drawing Sheets

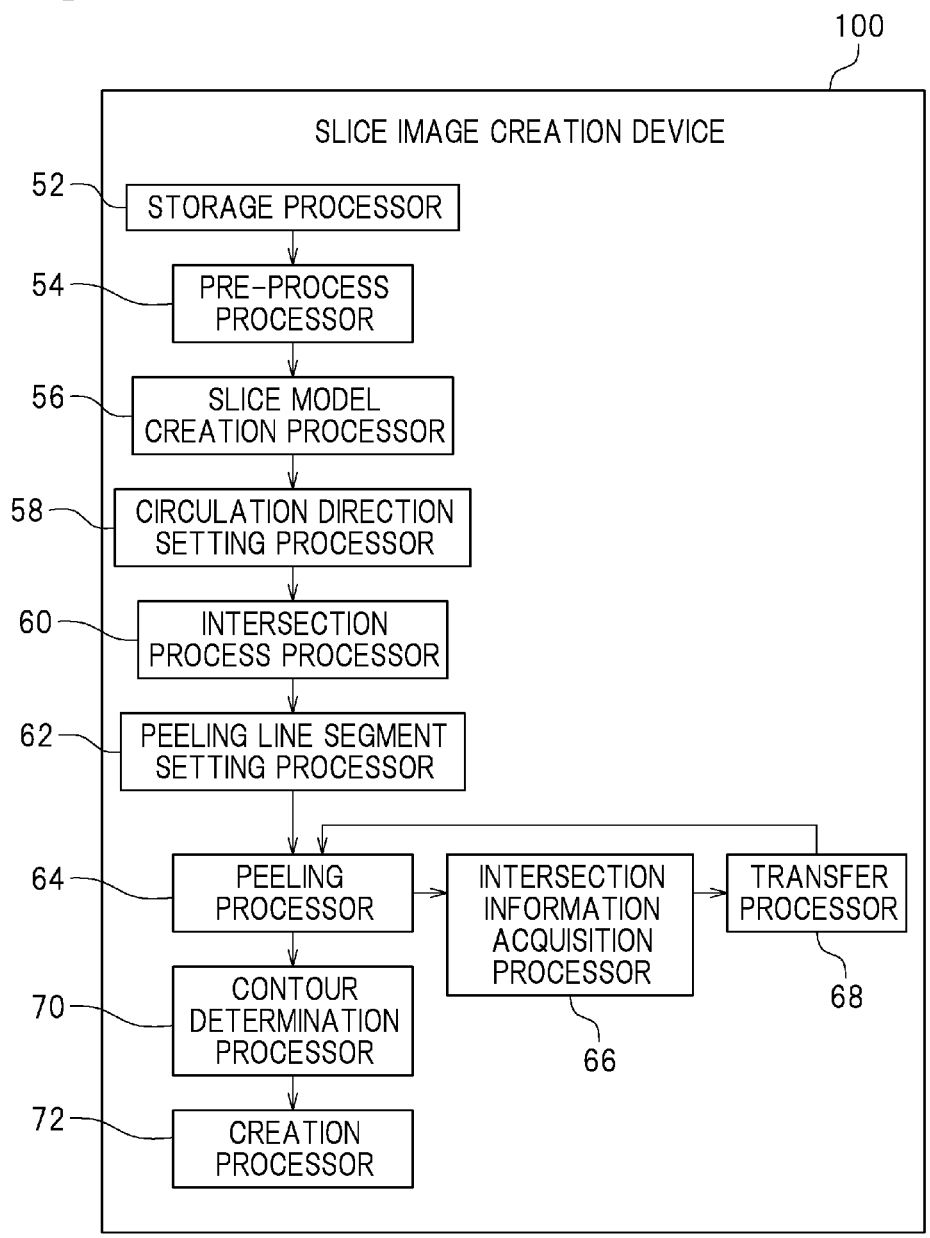

SLICE IMAGE CREATION DEVICE, THREE-DIMENSIONAL PRINTING SYSTEM AND SLICE IMAGE CREATION METHOD

CROSS REFERENCE TO RELATED APPLICATIONS

The present application claims priority to Japanese Patent Application No. 2015-157092 filed on Aug. 7, 2015, which is incorporated by reference herein in its entirety.

BACKGROUND OF THE INVENTION

1. Field of the Invention

The present invention relates to a slice image creation device, a three-dimensional printing system, and a slice image creation method.

2. Description of the Related Art

Conventionally, a three-dimensional printing device that prints a desired three-dimensional object (hereinafter, referred to as a "target object") is known. This type of three-dimensional printing device uses, for example, a computer-aided design device (hereinafter, referred to also as a "CAD device") to create data on a three-dimensional object which is usable to print the target object (hereinafter, such a three-dimensional model will be referred to as a "target object model") (see, for example, Japanese PCT National-Phase Patent Publication No. 2003-535712). The target object model is sliced at a predetermined interval to create a plurality of two-dimensional slice models corresponding to cross-sectional shapes of the target object (hereinafter, such a two-dimensional slice model will be referred to as a "target slice model").

A target slice model is defined by a contour of the target object. The target slice model is divided into a printing region, which is to be printed, and a non-printing region, which is not to be printed, along the contour. Thus, for example, the printing region in the region of the target slice model is colored white and the non-printing region is colored black by the CAD device, so that a slice image (hereinafter, referred to as a "target slice image"), which is an image of the target slice model, is created. The slice image includes a contour that distinguishes the printing region and the non-printing region from each other.

A three-dimensional printing device includes, for example, a table provided with an opening, a tank that is located on the table and accommodates a photocurable resin, a holder that is located above the tank and is movable up and down, and an optical device that is located below the table and outputs light. Light that is output from the optical device is directed toward the photocurable resin in the tank through the opening in the table. A portion of the photocurable resin, accommodated in the tank, that is irradiated with the light is cured. The position to be irradiated with the light is controlled to appropriately change the position in the photocurable resin to be cured, so that a portion of the photocurable resin located in the region colored white (printing region), in the target slice image, is cured whereas a portion of the photocurable resin located in the region colored black (non-printing region) is not cured. As a result, a cross-sectional shape conformed to the target slice image is formed. The holder is sequentially moved up to continuously expand the resin layer downward. In this manner, a desired target object is printed.

There may be a case where the target object to be printed is a combination of a plurality of singular objects (hereinafter, referred to as "unit objects") (such a combination will be referred to as a "whole target object"). For example, FIG. 13A is a perspective view of a target object model 170 corresponding to the whole object (hereinafter, such a target object model will be referred to as a "whole object model 170"). FIG. 13B is a side view of the whole object model 170. As shown in FIG. 13B, the whole object model 170 is defined by contours of unit object models 170a, 170b and 170c corresponding to a plurality of unit objects. FIG. 14 shows a slice model 172 obtained as a result of slicing the whole object model 170 shown in FIG. 13B at position PT100 (hereinafter, such a slice model will be referred to as a "whole slice model 172"). As shown in FIG. 14, the whole slice model 172 is defined by contours 173a, 173b and 173c of the plurality of unit object models 170a, 170b and 170c, like the whole object model 170. The whole slice model 172 may include an intersection 184, at which the plurality of contours 173a, 173b and 173c cross each other.

Before a slice image of the whole slice image 172 (hereinafter, such a slice image will be referred to as a "whole slice image") is created, the CAD device or the like traces the contours of the whole slice image 172 to extract a contour showing the entirety of the whole slice model 172 and distinguishes a printing region and a non-printing region of the whole slice model 172 from each other, among the plurality of contours 173a, 173b and 173c (hereinafter, this process will be referred to as "peeling"). For example, in the case where the CAD device traces the contour 173a in a direction of the arrows on the contour 173a in FIG. 14, the CAD device transfers from the contour 173a to another contour at the intersection 184. However, at the intersection 184, there are a plurality of contours to which the CAD device may transfer. Specifically, at the intersection 184, there are two contours to which the CAD device may transfer, namely, the contour 173b and the contour 173c. Therefore, there is a risk that the CAD device may transfer to the contour 173b despite that the CAD device should transfer to the contour 173c. When this occurs, the CAD device does not perform the desired peeling for the whole slice model 172 correctly ("peeling" refers to acquiring a contour distinguishing a printing region and a non-printing region from each other), and thus may not create a desired whole slice image. In the case where the desired whole slice image is not created, a desired whole object is not printed. As described above, "peeling" refers to acquiring a contour distinguishing a printing region and a non-printing region from each other. The expression "perform peeling" refers to tracing such a contour distinguishing a printing region and a non-printing region from each other. In the case where the CAD device, while performing the peeling, encounters an intersection at which there are a plurality of contours to which the CAD device may transfer (e.g., intersection 184), the CAD device transfers to the contour distinguishing the next printing region and the next non-printing region after passing the intersection. This keeps on selecting a contour located on the outermost profile of the printing region.

SUMMARY OF THE INVENTION

Preferred embodiments of the present invention provide a slice image creation device, a three-dimensional printing system and a slice image creating method, usable for a three-dimensional printing device that prints a target object as a printing target, that obtains a desired slice image.

A slice image creation device according to a preferred embodiment of the present invention is usable for a three-dimensional printing device that prints a target object as a printing target. The slice image creation device slices a target object model, which is a three-dimensional model corresponding to the target object, at a predetermined interval to create a target slice model and creates a target slice image of the target slice model. The target slice model is defined by a plurality of contours including a plurality of line segments, and includes an intersection at which at least two of the plurality of contours cross each other. The plurality of contours include an island contour representing a shape of an outer profile of the target object and a hole contour representing a shape of a hole in the target object. The slice image creation device includes a circulation direction setting processor, a peeling line segment setting processor, a peeling processor, an intersection information acquisition processor, a transfer processor, and a creation processor. The circulation direction setting processor is configured or programmed to set different circulation directions for the island contour and the hole contour from each other. The peeling line segment setting processor is configured or programmed to set, among the plurality of line segments of the plurality of contours of the target slice model, a peeling line segment on which peeling is to be performed, the peeling being performed to acquire a contour distinguishing a printing region corresponding to the target slice model to be printed by the three-dimensional printing device and a non-printing region not to be printed by the three-dimensional printing device. The peeling processor is configured or programmed to perform the peeling on the peeling line segment in the circulation direction of the peeling line segment. The intersection information acquisition processor is configured or programmed to, when the peeling reaches the intersection while being performed on the peeling line segment by the peeling processor, acquire intersection information including an intersection angle that is defined at the intersection by the peeling line segment and each of a plurality of candidate line segments, the intersection angle being defined by the peeling line segment extending in a direction that is the same as the circulation direction of the peeling line segment, the plurality of candidate line segments being included in the at least two contours crossing each other at the intersection. The transfer processor is configured or programmed to set, among the plurality of candidate line segments, a candidate line segment that has the smallest intersection angle, that distinguishes the printing region and the non-printing region from each other, and that is located at an outermost profile, as the line segment to which the peeling is going to be transferred next from the peeling line segment at the intersection, and to set the candidate line segment as a new peeling line segment. The creation processor is configured or programmed to set the line segments on which the peeling has been performed continuously by the peeling processor as one generated contour, and to divide the target slice model into the printing region and the non-printing region based on the generated contour to create the target slice image.

According to the above-described slice image creation device, in the case where the peeling, while being performed on the peeling line segment by the peeling processor, reaches the intersection at which a plurality of contours cross each other, the intersection information acquisition processor acquires angle information representing the intersection angle defined by the peeling line segment and each of a plurality of candidate line segments. The line segment to which the peeling is going to be transferred next at the intersection from the current peeling line segment on which the peeling is being performed, is a line segment located closest to the current peeling line segment in a direction that is the same as the circulation direction of the current peeling line segment. According to a preferred embodiment of the present invention, the intersection angles are acquired, and the candidate line segment that has the smallest intersection angle and is located on the outermost profile is set as the line segment to which the peeling is going to be transferred next at the intersection. In this manner, even for a target slice model including an intersection at which a plurality of contours cross each other, the line segment to which the peeling is going to be transferred next at the intersection is correctly determined. Therefore, the peeling on the contours is able to be performed correctly for the target slice model, and thus desired contours are obtained. As a result, a desired target slice image is created.

In a preferred embodiment of the present invention, the intersection information includes circulation direction information indicating whether the circulation direction of each of the candidate line segments is an In direction approaching the intersection or an Out direction separating away from the intersection. The intersection information acquisition processor acquires the circulation direction information on each of the candidate line segments. The transfer processor sets a line segment that has the smallest intersection angle and is located on the outermost profile, among the candidate line segments having the Out direction as the circulation direction, as the new peeling line segment.

According to the above-described preferred embodiment, the intersection information acquisition processor acquires the circulation direction information on each of the candidate line segments. Among the candidate line segments, the line segment having the In direction as the circulation direction is not the line segment to which the peeling is going to be transferred next at the intersection because the peeling would be performed in the opposite direction from the peeling on the current peeling line segment. In this preferred embodiment, in the case where the line segment having the smallest intersection angle has the In direction as the circulation direction, such a line segment is deleted from the candidate line segments to which the peeling may be transferred. Therefore, the line segment to which the peeling is going to be transferred next at the intersection is determined more correctly.

In another preferred embodiment of the present invention, the intersection information includes peeling information indicating whether each of the candidate line segments is a peeled line segment on which the peeling has already been performed by the peeling processor or a non-peeled line segment on which the peeling has not been performed by the peeling processor. The intersection information acquisition processor acquires the peeling information on each of the candidate line segments. The transfer processor sets a line segment that has the smallest intersection angle and is located on the outermost profile, among the candidate line segments indicated by the peeling information as being a non-peeled line segment, as the new peeling line segment.

According to the above-described preferred embodiment, the intersection information acquisition processor acquires the peeling information on each of the candidate line segments. Among the candidate line segments, the line segment on which the peeling has already been performed is not the line segment to which the peeling is going to be transferred next at the intersection. In this preferred embodiment, in the case where the peeling has already been performed on the line segment having the smallest intersection angle, such a line segment is deleted from the candidate line segments to which the peeling may be transferred. Therefore, the line segment to which the peeling is going to be transferred next at the intersection is determined more correctly.

In still another preferred embodiment of the present invention, the target slice model includes a plurality of the intersections. The slice image creation device further includes an intersection process processor configured or programmed to extract, from the plurality of intersections, a plurality of intersections having a distance therebetween shorter than a predetermined distance, and to integrate the extracted intersections into one integrated intersection.

In the case where there are a plurality of intersections at which a plurality of contours cross each other and the distance between the intersections is shorter than a predetermined distance, the computer program may make an erroneous recognition of the intersections, resulting in a failure of peeling on the contours. For example, the computer program may erroneously recognize that the peeling has reached an intersection close to the intersection that is to be reached by the peeling, despite that the peeling has reached the intersection that is to be reached by the peeling. However, in the above-described preferred embodiment, the plurality of intersections, having a distance therebetween shorter than a predetermined distance, are integrated into one integrated intersection. Therefore, the above-described erroneous recognition is prevented in advance.

In still another preferred embodiment of the present invention, the intersection process processor is configured or programmed to set the integrated intersection at a position having an equal distance to the extracted intersections, and to delete the extracted intersections.

According to the above-described preferred embodiment, the integrated intersection is set at a position having an equal distance to the plurality of intersections to be integrated. Thus, the distance between the integrated intersection and each of the intersections to be integrated is made as short as possible. Therefore, a target slice image close to the cross-sectional shape of the target object, which is the printing target, is created.

A three-dimensional printing system according to a preferred embodiment of the present invention includes the three-dimensional printing device; and the slice image creation device according to any of the above-described preferred embodiments of the present invention.

According to the above-described preferred embodiment, the three-dimensional printing device including the slide image creation device described in any of the above-described preferred embodiments of the present invention is provided.

A slice image creation method according to a preferred embodiment of the present invention is usable for a three-dimensional printing device that prints a target object as a printing target. The slice image creation method includes the steps of slicing a target object model, which is a three-dimensional model corresponding to the target object, at a predetermined interval to create a target slice model, and creating a target slice image of the target slice model. The target slice model is defined by a plurality of contours including a plurality of line segments, and includes an intersection at which at least two of the plurality of contours cross each other. The plurality of contours include an island contour representing a shape of an outer profile of the target object and a hole contour representing a shape of a hole in the target object. The slice image creation method includes a circulation direction setting step, a peeling line segment setting step, a peeling step, an intersection information acquisition step, a transfer step, and a creation step. In the circulation direction setting step, different circulation directions are set for the island contour and the hole contour from each other. In the peeling line segment setting step, among the plurality of line segments of the plurality of contours of the target slice model, a peeling line segment on which peeling is to be performed is set, the peeling being performed to acquire a contour distinguishing a printing region corresponding to the target slice model to be printed by the three-dimensional printing device and a non-printing region not to be printed by the three-dimensional printing device. In the peeling step, the peeling is performed on the peeling line segment in the circulation direction of the peeling line segment. In the intersection information acquisition step, when the peeling reaches the intersection while being performed on the peeling line segment in the peeling step, intersection information is acquired including an intersection angle that is defined at the intersection by the peeling line segment and each of a plurality of candidate line segments, the intersection angle being defined by the peeling line segment extending in a direction that is the same as the circulation direction of the peeling line segment, the plurality of candidate line segments being included in the at least two contours crossing each other at the intersection. In the transfer step, among the plurality of candidate line segments, a candidate line segment that has the smallest intersection angle, that distinguishes the printing region and the non-printing region from each other, and that is located at an outermost profile is set as the line segment to which the peeling is going to be transferred next from the peeling line segment at the intersection, and the candidate line segment is set as a new peeling line segment. In the creation step, the line segments on which the peeling has been performed continuously in the peeling step is set as one generated contour, and the target slice model is divided into the printing region and the non-printing region based on the generated contour to create the target slice image.

In still another preferred embodiment of the present invention, the intersection information includes circulation direction information indicating whether the circulation direction of each of the candidate line segments is an In direction approaching the intersection or an Out direction separating away from the intersection. In the intersection information acquisition step, the circulation direction information is acquired on each of the candidate line segments. In the transfer step, a line segment that has the smallest intersection angle and is located on the outermost profile, among the candidate line segments having the Out direction as the circulation direction, is set as the new peeling line segment.

In still another preferred embodiment of the present invention, the intersection information includes peeling information indicating whether each of the candidate line segments is a peeled line segment on which the peeling has already been performed in the peeling step or a non-peeled line segment on which the peeling has not been performed in the peeling step. In the intersection information acquisition step, the peeling information is acquired on each of the candidate line segments. In the transfer step, a line segment that has the smallest intersection angle and is located on the outermost profile, among the candidate line segments indicated by the peeling information as being a non-peeled line segment, is set as the new peeling line segment.

In still another preferred embodiment of the present invention, the target slice model includes a plurality of the intersections. The slice image creation method further includes an intersection process step of extracting, from the plurality of intersections, a plurality of intersections having a distance therebetween shorter than a predetermined distance, and integrating the extracted intersections into one integrated intersection.

In still another preferred embodiment of the present invention, in the intersection process step, the integrated intersection is set at a position having an equal distance to the extracted intersections, and the extracted intersections are deleted.

According to various preferred embodiments of the present invention, a desired target slice image corresponding to a target object to be printed is obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a block diagram of a slice image creation device.

DETAILED DESCRIPTION OF THE PREFERRED EMBODIMENTS

Hereinafter, three-dimensional printing systems including slice image creation devices according to preferred embodiments of the present invention will be described with reference to the drawings. The preferred embodiments described below are not intended to limit the present invention to any specific preferred embodiment in anyway. Elements and portions having identical functions bear identical reference signs, and the same descriptions may be omitted appropriately or simplified.

Figure 1:
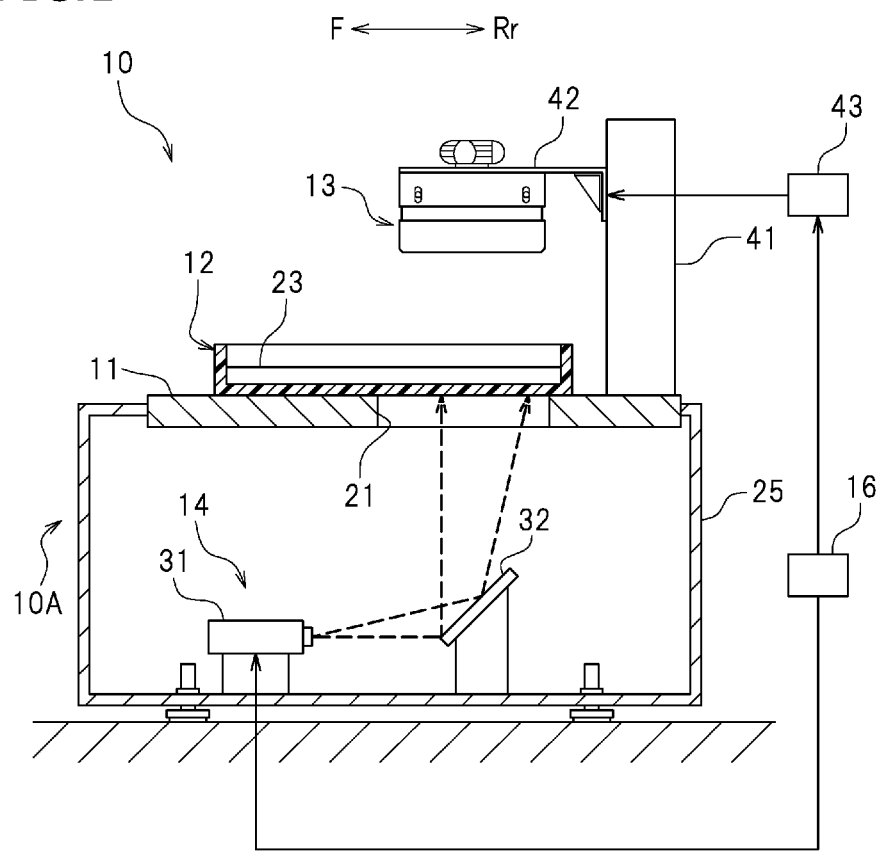
FIG. 1 is a cross-sectional view of a three-dimensional printing system in a preferred embodiment of the present invention.
Figure 2:
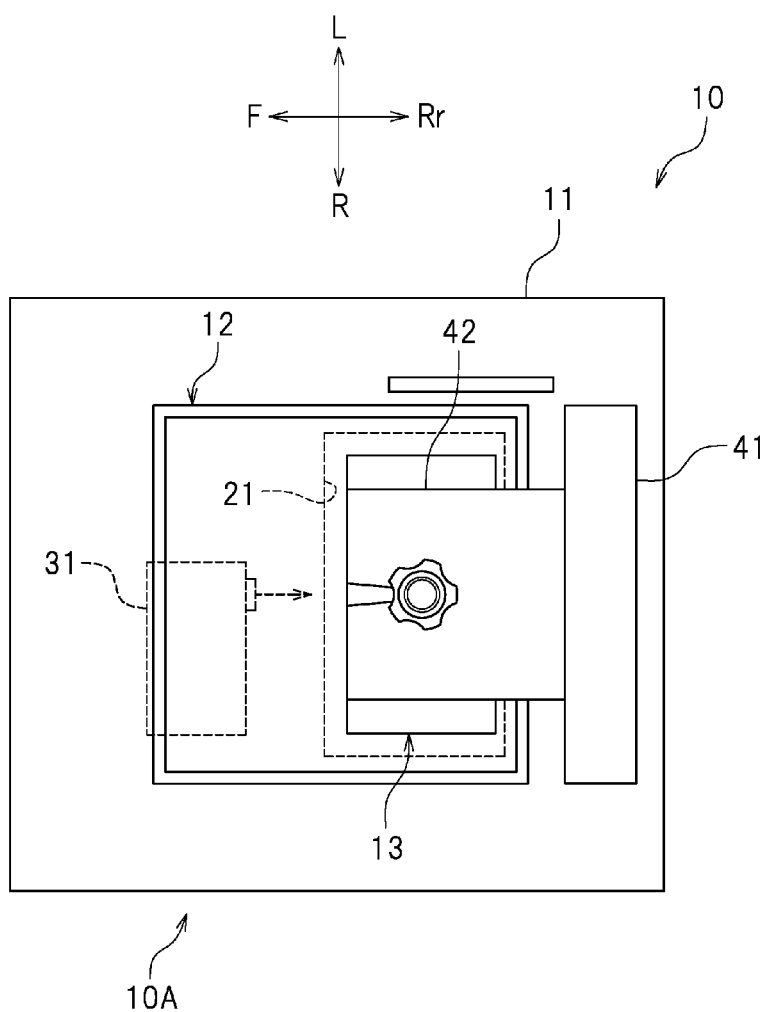
FIG. 2 is a plan view of the three-dimensional printing system.

FIG. 1 is a cross-sectional view of a three-dimensional printing system 10 according to the present preferred embodiment. FIG. 2 is a plan view of the three-dimensional printing system 10. In the drawings, letters F, Rr, L and R respectively represent front, rear, left and right. These directions are provided merely for the sake of convenience, and do not limit the form of installation of the three-dimensional printing system 10 in any way.

The three-dimensional printing system 10 is a system that prints a three-dimensional object. As shown in FIG. 1, the three-dimensional printing system 10 includes a three-dimensional printing device 10A and a slice image creation device 100 (see FIG. 7). A cross-sectional shape of a three-dimensional object is prepared in advance. The three-dimensional printing device 10A cures a photocurable resin in a liquid state to form a resin layer having a shape corresponding to the prepared cross-sectional shape of the three-dimensional object and sequentially stacks such resin layers to print the three-dimensional object. Herein, the term "cross-sectional shape" refers to the shape of a cross-section obtained as a result of slicing a three-dimensional object at a predetermined thickness (e.g., about 0.1 mm). A "photocurable resin" is a resin that is cured when being irradiated with light including a light component having a predetermined wavelength. The three-dimensional printing device 10A includes a table 11, a tank 12, a holder 13, an optical device 14, and a controller 16.

The table 11 is supported by a case 25. The table 11 is provided with an opening 21 through which light to be directed toward a photocurable resin 23 is allowed to pass. The tank 12 accommodates the photocurable resin 23 in a liquid state. The tank 12 is placed on the table 11 so as to be attachable to the table 11. As shown in FIG. 2, the tank 12 covers the opening 21 in the table 11 when being placed on the table 11. The tank 12 may be formed of a light-transmissive material, for example, a transparent material.

As shown in FIG. 1, the holder 13 is located above the tank 12 and above the opening 21 in the table 11. The holder 13 is movable up and down. When being moved down, the holder 13 is immersed in the photocurable resin 23 in the tank 12. When being moved up, the holder 13 pulls up the photocurable resin 23, which is cured as a result of being irradiated with light. In this example, the table 11 is provided with a column 41 extending in an up-down direction. A slider 42 is attached to the front of the column 41. The slider 42 is movable up and down along the column 41. The slider 42 is movable up and down by a motor 43. In this example, the holder 13 is attached to the slider 42. The holder 13 is located to the front of the column 41. The holder 13 is movable up and down by the motor 43.

The optical device 14 is located below the table 11. The optical device 14 directs light having a predetermined wavelength toward the photocurable resin 23 in a liquid state that is accommodated in the tank 12. The optical device 14 is accommodated in the case 25 provided below the table 11. The optical device 14 includes a projector 31 and a mirror 32. The projector 31 is a light source emitting light. The projector 31 is located below a front portion of the table 11. The projector 31 is located to the front of the holder 13. A lens (not shown) is located to the rear of the projector 31. The projector 31 emits light in a front-to-rear direction via the lens. The mirror 32 reflects the light, emitted from the projector 31, toward the tank 12. The mirror 32 is located below the opening 21 in the table 11 and to the rear of the projector 31. The light emitted from the projector 31 is reflected by the mirror 32. The light reflected by the mirror 32 is directed toward the photocurable resin 23 in the tank 12 through the opening 21 in the table 11.

The controller 16 is connected with the motor 43 controlling the slider 42, having the holder 13 attached thereto, to be movable up and down, and is also connected with the projector 31 of the optical device 14. The controller 16 drives the motor 43 to move the slider 42 and the holder 13 upward or downward. The controller 16 controls the energy, luminosity, amount, wavelength band, and shape of the light emitted from the projector 31, the position in the photocurable resin 23 that is to be irradiated with the light, the timing to emit the light, and the like. There is no specific limitation on the structure of the controller 16. For example, the controller 16 may be a computer and may include a central processing unit (hereinafter, referred to as a "CPU") and a ROM, a RAM or the like storing a program or the like to be executed by the CPU.

The structure of the three-dimensional printing device 10A in this preferred embodiment has been described. For printing a target object, which is a printing target, by the three-dimensional printing device 10A, the CAD device or the like is used to create a target object model corresponding to the target object. The target object model is sliced at a predetermined interval to create a plurality of target slice models corresponding to cross-sections of the target object. In this example, the "target slice model" is STL data.

The target slice models are each divided into a printing region, which is to be printed, and a non-printing region, which is not to be printed. In this example, the printing region and the non-printing region are provided with different colors from each other to create a target slice image of the target slice model. For example, the printing region is colored white whereas the non-printing region is colored black to create the target slice image.

The three-dimensional printing device 10A uses the created target slice image to control the position to which the light emitted from the projector 31 of the optical device 14 is to be directed. For example, the position of a portion of the photocurable resin 23 that is to be cured is appropriately changed, so that a portion of the photocurable resin 23 that is located in correspondence with the printing region is cured, whereas a portion of the photocurable resin 23 that is located in correspondence with the non-printing region is not cured. In this manner, a cross-section conformed to the target slice image is printed. The holder 13 is sequentially moved up to sequentially form cured resin layers in a downward direction. Thus, a desired target object is printed.

Figure 14:
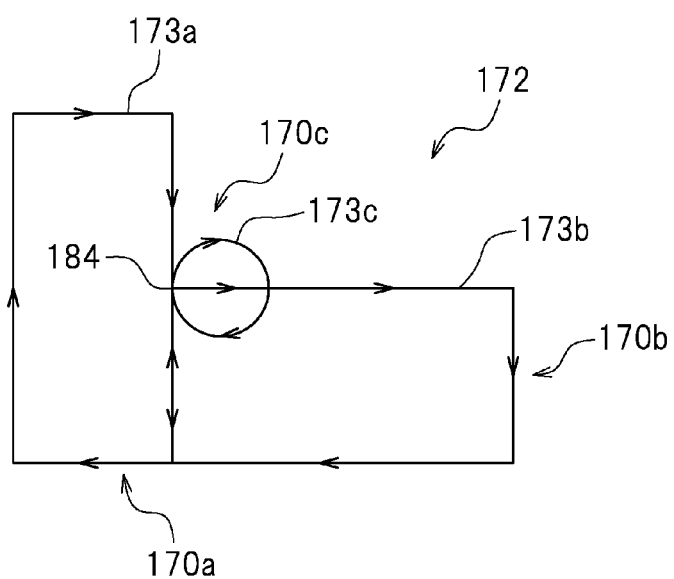
FIG. 14 shows a whole slice model obtained as a result of slicing the whole object model shown in FIG. 13B at position PT100.

As described above, in the case where as shown in FIG. 14, peeling is performed on the contour 173a in the direction of the arrows on the contour 173a, the peeling is transferred from the contour 173a to another contour at the intersection 184, at which a plurality of contours cross each other. However, at the intersection 184, there are a plurality of contours to which the peeling may be transferred. Specifically, at the intersection 184, there are two contours to which the peeling may be transferred, namely, the contour 173b and the contour 173c. Therefore, there is a risk that the peeling may be transferred to the contour 173b despite that the peeling should be transferred to the contour 173c. If the peeling is transferred to the contour 173b, the peeling is not performed for the whole slice model 172 correctly, and thus a desired whole slice image may not be created. In the case where the desired whole slice image is not created, a desired whole object is not printed.

In such a situation, in this preferred embodiment, the slice image creation device 100 capable of correctly performing peeling on the contours of a whole slice model is provided.

The present inventor made studies regarding a cause of failure of peeling on the contours. As a result, the present inventor has discovered that there may be a case where the peeling is not performed correctly because when the plurality of contours 173a, 173b and 173c cross each other at one intersection, for example, at the intersection 184 as described above, the contour to which the peeling is going to be transferred next is not clearly determined. The present inventor has discovered that the contour to which the peeling is going to be transferred next at the intersection 184 may be correctly determined by acquisition of information about each of the plurality of contours 173a, 173b and 173c and the intersection 184, at which the plurality of contours 173a, 173b and 173c cross each other (hereinafter, such information will be referred to as "intersection information"). Specific intersection information is as follows.

Figure 3:
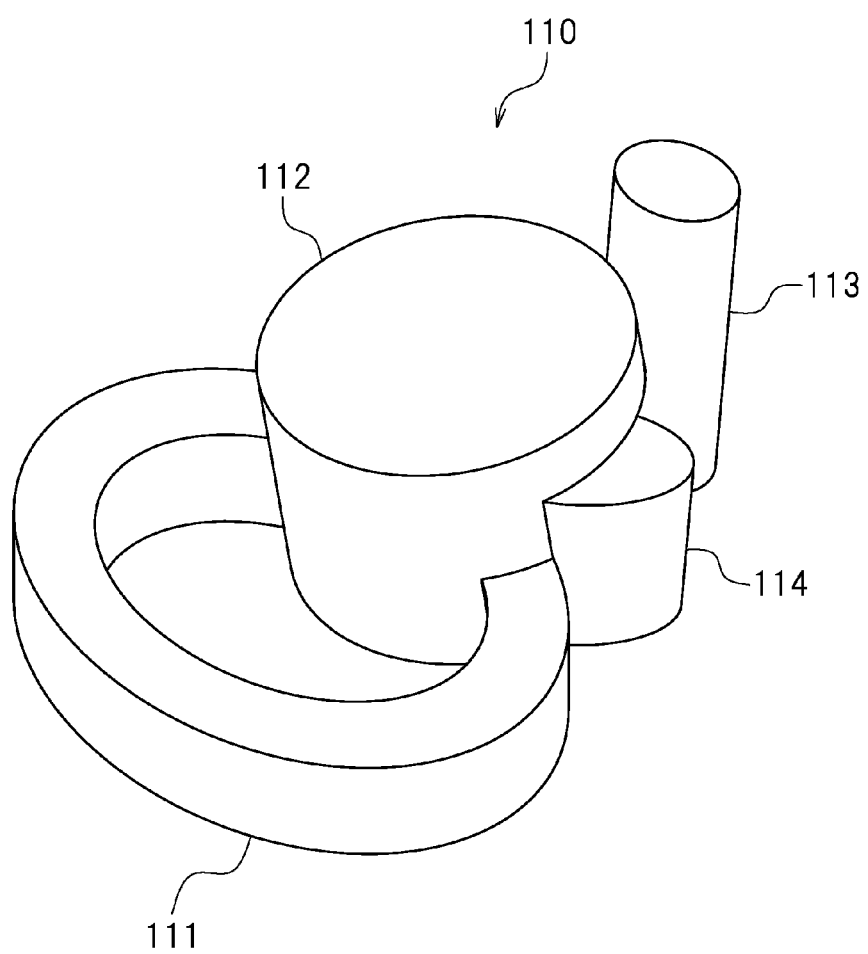
FIG. 3 shows an example of target object model, and is a perspective view of the target object model.
Figure 4:
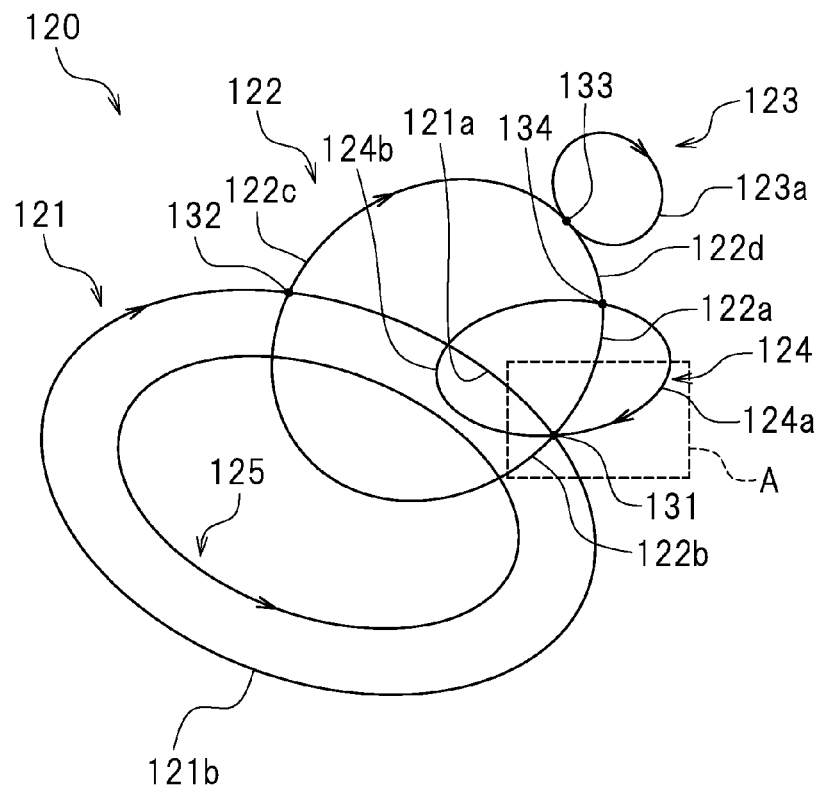
FIG. 4 shows an example of target slice model of the target object model shown in FIG. 3.

First, contours defining a target object mode will be described. FIG. 3 shows an example of target object model 110, and is a perspective view of the target object model 110. FIG. 4 shows an example of target slice model 120 of the target object model 110 shown in FIG. 3. The target object model 110 shown in FIG. 3 is a whole object model that is an assembly of four unit object models 111, 112, 113 and 114. As shown in FIG. 4, contours defining the target slice model 120 include island contours 121, 122, 123 and 124 and a hole contour 125. Herein, the "island contour" represents an outer profile of a printing region to be printed by the three-dimensional printing device 10A. The "hole contour" represents the shape of a hole. In a computer program, a circulation direction is set for each of the island contours 121 through 124 and the hole contour 125 in order to distinguish the island contours 121 through 124 and the hole contour 125 from each other. In, for example, the target slice model 120 shown in FIG. 4, the circulation direction of the island contours 121 through 124 is a clockwise direction. The circulation direction of the hole contour 125 is a counterclockwise direction. It is sufficient that the circulation direction of the island contours 121 through 124 and the circulation direction of the hole contour 125 are different from each other. For example, the circulation direction of the island contours 121 through 124 may be the counterclockwise direction whereas the circulation direction of the hole contour 125 may be the clockwise direction. In this example, the circulation direction is also a direction for peeling to which peeling is performed.

Figure 5:
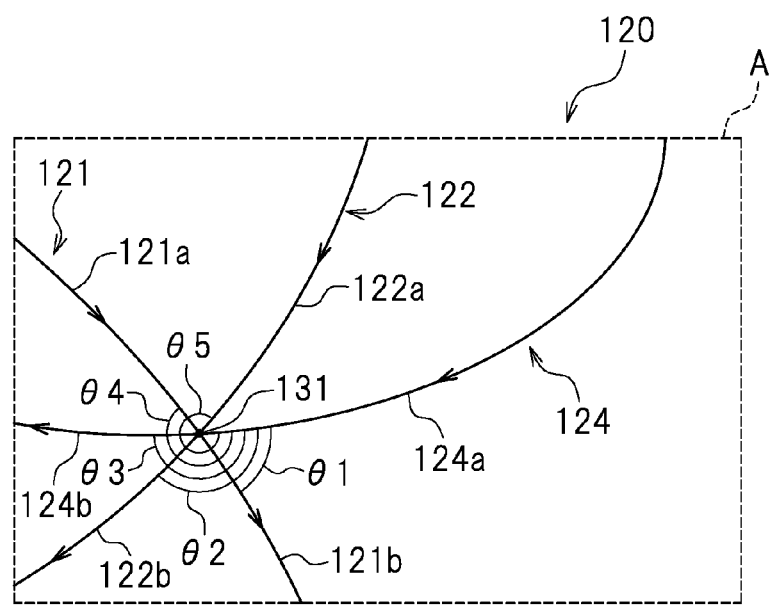
FIG. 5 is a partial enlarged view of the target slice model shown in FIG. 4.

A contour includes a plurality of line segments. A line segment is a line connecting an intersection and an intersection. For example, a line segment 124a of the contour 124 is a line connecting an intersection 131 and an intersection 134. FIG. 5 is an enlarged view of area A of the target slice model 120 shown in FIG. 4. As shown in FIG. 5, for example, the island contour 121 includes at least line segments 121a and 121b. The island contour 122 includes at least line segments 122a and 122b.

Now, the above-described intersection information will be described in detail. The target slice model 120 includes an intersection 131, at which the three contours 121, 122 and 124 cross each other. It is assumed that, for example, a line segment on which the peeling is being performed (hereinafter, such a line segment will be referred to as a "peeling line segment") is the line segment 124a of the contour 124. In the case where the peeling is performed on the peeling line segment 124a in the circulation direction thereof and reaches the intersection 131, line segments that are candidates to which the peeling is to be transferred (hereinafter, such line segments will be referred to as "candidate line segments") are the line segments 121a and 121b of the contour 121, the line segments 122a and 122b of the contour 122, and a line segment 124b of the contour 124. Herein, intersection information on the candidate line segments of the contours, namely, the line segments 121a, 121b, 122a, 122b and 124b is acquired, and thus the line segment to which the peeling is going to be transferred next is determined. Specifically, in this preferred embodiment, the intersection information includes "angle information", "circulation direction information" and "peeling information".

The line segment to which the peeling is going to be transferred next at the intersection 131 is the line segment that is closest to the peeling line segment 124a in a direction that is the same as the circulation direction of the peeling line segment 124a (namely, the circulation direction of the contour 124; in this case, the clockwise direction). In the example shown in FIG. 5, the line segment 121b is the new peeling line segment to which the peeling line segment 124a should be transferred next at the intersection 131. In order to find the line segment located closest to the peeling line segment 124a in a direction that is the same as the circulation direction of the peeling line segment 124a, the "angle information" is used. The "angle information" is information representing an angle, at the intersection, defined by the peeling line segment and each of the plurality of candidate line segments (hereinafter, such an angle will be referred to as an "intersection angle"). The intersection angle is an angle defined in the circulation direction of the peeling line segment, on which the peeling is being performed, from the peeling line segment. In the example shown in FIG. 5, the intersection angle defined, at the intersection 131, by the peeling line segment 124a and the candidate line segment 121b is θ1. Similarly, the intersection angles defined, at the intersection 131, by the peeling line segment 124a and the candidate line segments 122b, 124b, 121a and 122a are respectively θ2, θ3, θ4 and θ5.

The line segment to which the peeling is going to be transferred next at the intersection 131 is a line segment having a circulation direction separating away from the intersection 131. Thus, the "circulation direction information" is used. The "circulation direction information" is information indicating whether the circulation direction of the candidate line segment is a direction approaching the intersection (hereinafter, referred to as an "In direction") or a direction separating away from the intersection (hereinafter, referred to as an "Out direction"). In the example shown in FIG. 5, the candidate line segments having a circulation direction that is the In direction are the line segments 121a and 122a. The candidate line segments having a circulation direction that is the Out direction are the line segments 121b, 122b and 124b. Therefore, based on the circulation direction information, the line segments 121a and 122a having the In circulation direction are removed from the candidate line segments to which the peeling may be transferred.

The line segment to which the peeling is going to be transferred next at the intersection 131 is a line segment on which the peeling has not been performed yet. Thus, the "peeling information" is used. The "peeling information" is information indicating whether or not the peeling has already been performed on the candidate line segment. Hereinafter, a line segment on which the peeling has already been performed will be referred to as a "peeled line segment", whereas a line segment on which the peeling has not been performed yet will be referred to also as a "non-peeled line segment". In the example shown in FIG. 5, it is assumed that all the candidate line segments 121a, 121b, 122a, 122b and 124b are non-peeled line segments.

In this preferred embodiment, the above-described three types of intersection information are used to determine the line segment to which the peeling is going to be transferred next, among the plurality of candidate line segments. Specifically, among the line segments that have a circulation direction that is the Out direction and are non-peeled among the plurality of candidate line segments, the line segment located closest to the peeling line segment in a direction that is the same as the circulation direction of the peeling line segment, namely, the line segment having the smallest angle with respect to the peeling line segment, is the line segment to which the peeling is going to be transferred next. For example, in the case where as shown in FIG. 5, the peeling reaches the intersection 131 while being performed on the peeling line segment 124a, the peeling is transferred to the line segment 121b, which has a circulation direction that is the Out direction, is non-peeled, and has the smallest angle θ1.

As described above, even for a target slice model having an intersection at which a plurality of contours cross each other, the transfer to the contour is performed correctly by acquisition of the intersection information. Thus, the failure of peeling on the contours is avoided.

Figure 6A:
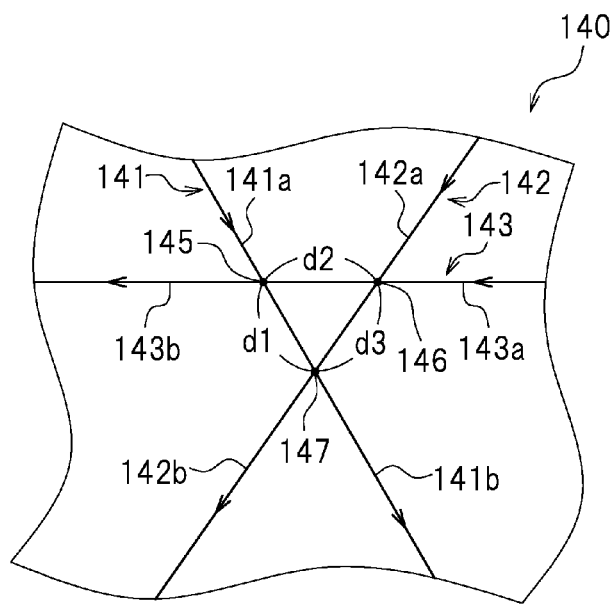
FIG. 6A shows an example of target slice model, and is a partial enlarged view of the target slice model.

The present inventor made further studies regarding a cause of failure of peeling on the contours. As a result, the present inventor has discovered that in the case where there are a plurality of intersections at which a plurality of contours cross each other and the intersections are close to each other, the computer program makes an erroneous recognition of the intersections, which results in a failure of peeling on the contours. FIG. 6A shows an example of target slice model 140, and is a partial enlarged view of the target slice model 140. In the example shown in FIG. 6A, there are a plurality of intersections 145, 146 and 147. It is assumed that the intersections 145, 146 and 147 are close to each other. In this example, the peeling performed on a peeling line segment 141a reaches the intersection 145, and then is transferred to another line segment from the peeling line segment 141a. However, since the intersections 145 through 147 are close to each other, the computer program may not correctly recognize the intersection reached by the peeling while the peeling is being performed. For example, the computer program may recognize that the peeling has reached the intersection 146 or 147 despite that the peeling has reached the intersection 145. In this case, the peeling is not transferred to a next line segment correctly, and thus the peeling may not be performed correctly.

The present inventor has discovered that in the case where the plurality of intersections 145 through 147 are close to each other, the intersections may be integrated into one intersection (hereinafter, referred to as an "integrated intersection"), and thus the erroneous recognition of the intersection reached by the peeling is avoided. There is no specific limitation on the procedure of integrating a plurality of intersections close to each other into one intersection. For example, it is assumed that as shown in FIG. 6A, distances d1, d2 and d3 between two intersections among the intersections 145 through 147 are each shorter than a predetermined distance. In the case where the distances d1, d2 and d3 between the intersections 145 through 147 are shorter than the predetermined distance, the intersections 145 through 147 are determined as being close to each other, and the intersections 145 through 147 are integrated into one intersection. In this case, as shown in, for example, FIG. 6B, the intersections 145 through 147 are integrated into an integrated intersection 148. Line segments 141a, 141b, 142a, 142b, 143a and 143b, which have been connected with the intersections 145 through 147, are connected to the integrated intersection 148. The intersections 145 through 147 shown in FIG. 6A are deleted. The integrated intersection 148 is a point having an equal distance to the pre-deletion intersections 145 through 147. Alternatively, the integrated intersection 148 may be any of the intersections 145 through 147. In the case where, for example, the integrated intersection is the intersection 145, the other intersections 146 and 147 are deleted, and the line segments 141b, 142a, 142b and 143a, which have been connected with the intersections 146 and 147, are connected to the intersection 145. Herein, the term "close" encompasses a case where intersections are in contact with each other.

With the above-described arrangement, the intersection reached by the peeling while the peeling is being performed is prevented from being erroneously recognized as another intersection close thereto.

In this preferred embodiment, as described above, the slice image creation device 100 has a function to determine the line segment to which the peeling is going to be transferred next by acquiring intersection information at each intersection and integrates a plurality of intersections into one integrated intersection.

Now, the slice image creation device 100 in this preferred embodiment will be described in detail. FIG. 7 is a block diagram of the slice image creation device 100. The slice image creation device 100 may be separated from the three-dimensional printing device 10A or may be built in the three-dimensional printing device 10A. The slice image creation device 100 may be, for example, a computer and may include a CPU and a ROM, a RAM or the like storing a program or the like to be executed by the CPU. In this example, a program stored on the computer is used to create a target slice image. The slice image creation device 100 is connected with the controller 16 (see FIG. 1) of the three-dimensional printing device 10A. The slice image creation device 100 may be a computer dedicated for the three-dimensional printing system 10 or a general-purpose computer.

The slice image creation device 100 includes a storage processor 52, a pre-process processor 54, a slice model creation processor 56, a circulation direction setting processor 58, an intersection process processor 60, a peeling line segment setting processor 62, a peeling processor 64, an intersection information acquisition processor 66, a transfer processor 68, a contour determination processor 70, and a creation processor 72. These processors may be implemented by execution of a computer program (hereinafter, referred to as a "program") stored on the slice image creation device 100.

Figure 8:
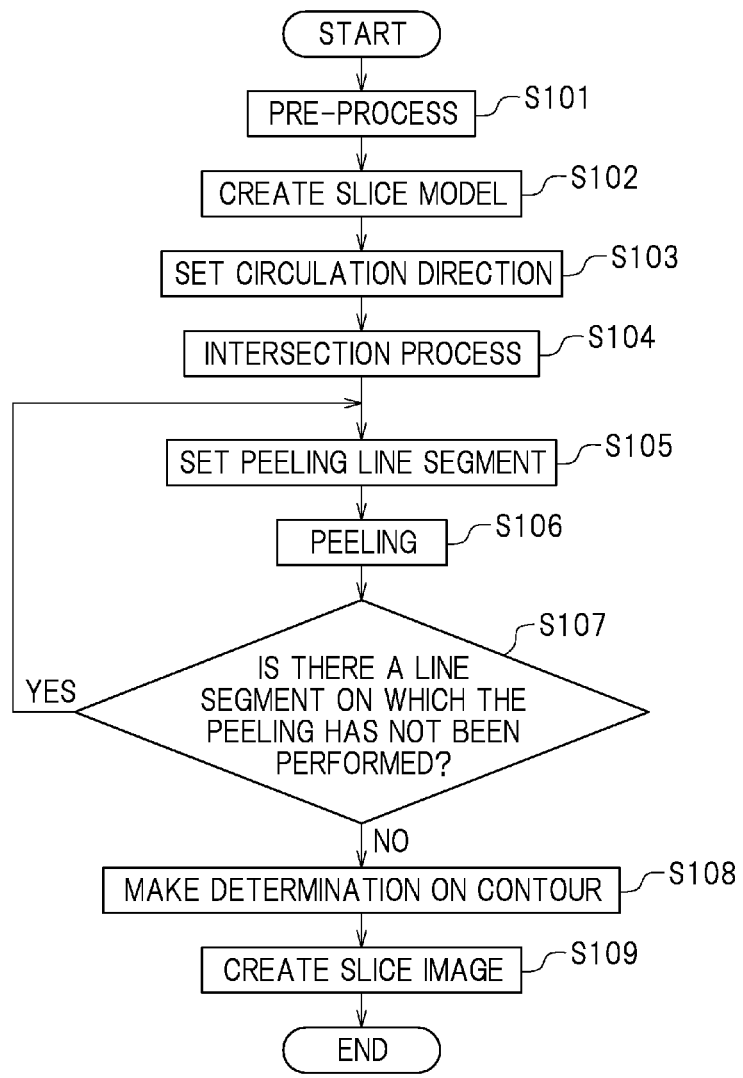
FIG. 8 is a flowchart showing a procedure of creating a target slice image.

FIG. 8 is a flowchart showing a procedure of creating a target slice image. In this example, a procedure of slicing the target object model 110 shown in FIG. 3 to create the target slice model 120 shown in FIG. 4 and then creating a target slice image 160 (see FIG. 12) of the target slice model 120 will be described with reference to the flowchart shown in FIG. 8.

In this example, data on the target object model 110 (see FIG. 3) corresponding to the target object is stored on the storage processor 52 in advance. The data on the target object model 110 is, for example, read onto the storage processor 52 from a storage medium or another computer (not shown) by an operation made by the user. The target object model 110 is specified by, for example, a set of a plurality of points on an XYZ orthogonal coordinate system, and is a three-dimensional model. The target object model 110 reproduces the target object by a combination of a plurality of polygons.

First, in step S101, the pre-process processor 54 performs a pre-process on the target object model 110 stored on the storage processor 52. The target object model 110 is often detailed data loyally reproducing a three-dimensional shape of the target object, which is a printing target. If the target object model 110 is used as it is, the process of creating the target slice image 160 (see FIG. 12) performed by the slice image creation device 100 may require a huge amount of time. Therefore, it is preferable that the pre-process processor 54 performs a pre-process on the target object model 110 to decrease the amount of data on the target object model 110. In this example, the pre-process processor 54 performs a smoothing process on the target object model 110. The smoothing process may be, for example, to decrease the number of polygons defining the target object model 110 in order to decrease the amount of data. There is no specific limitation on the method for the smoothing process. For example, a conventionally known method for the smoothing process may be used. For example, the Gaussian function may be used for the smoothing process. In this example, the data on the post-smoothing process target object model 110 is stored on the storage processor 52. The pre-process in step S101 may be omitted.

Next, in step S102, for example, the slice model creation processor 56 creates the target slice model 120 as shown in FIG. 4. In this example, the slice model creation processor 56 slices the target object model 110 shown in FIG. 3 at a predetermined interval in a horizontal direction to create a plurality of two-dimensional target slice models corresponding to cross-sectional shapes of the target object. The direction in which the target object model 110 is sliced is not limited to the horizontal direction, and the may be a vertical direction. The predetermined interval is a value determined in advance, and is stored on the storage processor 52 in advance. The target slice model 120 shown in FIG. 4 is one of the plurality of created target slice models. As described above, the target slice model 120 is defined by the island contours 121 through 124 and the hole contour 125. The target slice model 120 created by the slice model creation processor 56 is stored on the storage processor 52.

Next, in step S103, the circulation direction setting processor 58 sets a circulation direction on each of the contours defining the target slice model 120. The circulation direction setting processor 58 sets different circulation directions for an island contour and a hole contour from each other. In the target slice model 120 shown in FIG. 4, the contours 121 through 124 are island contours, and the contour 125 is a hole contour. In this example, the circulation direction setting processor 58 sets the circulation direction of the island contours 121 through 124 to the clockwise direction. The circulation direction setting processor 58 sets the circulation direction of the hole contour 125 to the counterclockwise direction.

Next, in step S104, the intersection process processor 60 performs an intersection process on the target slice model 120. As described above, for example, the target slice model 140 shown in FIG. 6A includes the intersections 145 through 147, and the distances d1, d2 and d3 between two of the intersections 145 through 147 are all shorter than a predetermined distance. In the case where the distances d1, d2 and d3 between the intersections 145 through 147 are shorter than the predetermined distance like this, the intersection process processor 60 determines that the intersections 145 through 147 are close to each other and extracts the intersections 145 through 147. Then, the intersection process processor 60 integrates the extracted intersections 145 through 147 into one intersection. The predetermined distance is a value determined in advance, and is stored on the storage processor 52 in advance. In the target slice model 140 shown in FIG. 6A, the intersections 145 through 147 are close to each other. Therefore, the intersection process processor 60 integrates the intersections 145 through 147 into the integrated intersection 148 (see FIG. 6B) and deletes the intersections 145 through 147. The intersection process processor 60 connects the line segments 141*a*, 141*b*, 142*a*, 142*b*, 143*a* and 143*b*, which have been connected with the intersections 145 through 147, to the integrated intersection 148. In the target slice model 120 shown in FIG. 4, the distances between the intersections are longer than, or equal to, the predetermined distance. Therefore, the intersection process processor 60 does not perform the process of integrating the plurality of intersections into one integrated intersection for the target slice model 120.

Next, in step S105, the peeling line segment setting processor 62 sets a peeling line segment for the start of the peeling. In this example, among the line segments of the contours which define the target slice model 120 having no peeling has been performed yet, a line segment that is located on the outermost profile is set by the peeling line segment setting processor 62 as the peeling line segment. The first time the process in step S105 is performed, the peeling has not been performed on any of the line segments. Therefore, the peeling line segment is either one of the line segments of the contours that are located on the outermost profile. In, for example, the target slice model shown in FIG. 4, the contour 121 is one of the contours located on the outermost profile. Therefore, the first time the process in step S105 is performed, the peeling line segment setting processor 62 sets, for example, the line segment 121*b* of the contour 121, as the peeling line segment.

Figure 9:
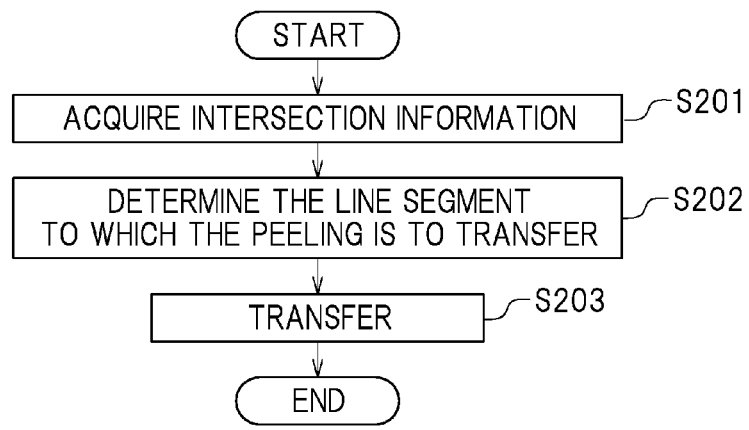
FIG. 9 is a flowchart showing a procedure of transfer from a peeling line segment to another line segment at an intersection.

Next, in step S106, the peeling processor 64 starts the peeling on the peeling line segment 121*b*. In this example, the peeling processor 64 starts the peeling in the circulation direction of the peeling line segment 121*b*, namely, the circulation direction of the contour 121 including the line segment 121*b*. In the target slice model 120 shown in FIG. 4, the contour 121 including the peeling line segment 121*b* is an island contour, and the circulation direction of the contour 121 is the clockwise direction. Therefore, the peeling processor 64 starts the peeling on the peeling line segment 121*b* in the clockwise direction. In the case where as shown in FIG. 5, the peeling line segment is the line segment 124*a* and the peeling is being performed on the line segment 124*a*, the peeling reaches the intersection 131, at which the plurality of contours 121, 122 and 124 cross each other. When reaching the intersection 131 like this, the peeling is transferred from the current peeling line segment 124*a* to another line segment. FIG. 9 is a flowchart showing a procedure of transfer from the peeling line segment 124*a* to another line segment. In this example, the procedure of transfer from the peeling line segment 124*a* to another line segment is performed insteps S201 through S203 shown in FIG. 9.

In this preferred embodiment, the determination on the line segment to which the peeling is going to be transferred next at the intersection 131 from the peeling line segment 124*a* is made based on the intersection information. Therefore, first, in step S201, the intersection information acquisition processor 66 acquires the intersection information on each of the candidate line segments 121*a*, 121*b*, 122*a*, 122*b* and 124*b*. In this example, the intersection information includes the "angle information", the "circulation direction information", and the "peeling information". As described above, the "angle information" is information representing the intersection angles θ1, θ2, θ3, θ4 and θ5 respectively defined at the intersection by the peeling line segment 124*a* and the plurality of candidate line segments 121*a*, 121*b*, 122*a*, 122*b* and 124*b*. The "circulation direction information" is information indicating whether the circulation direction of each of the candidate line segments 121*a*, 121*b*, 122*a*, 122*b* and 124*b* is the In direction approaching the intersection 131 or the Out direction separating away from the intersection 131. The "peeling information" is information indicating whether or not each of the candidate line segments 121*a*, 121*b*, 122*a*, 122*b* and 124*b* is a peeled line segment on which the peeling has already been performed. For example, regarding the line segment 121*b* at the intersection 131, the angle information indicates that the intersection angle is θ1, the circulation direction information indicates that the circulation direction is the Out direction, and the peeling information indicates that the peeling has not been performed yet on the line segment 121*b*.

After the intersection information on each of the plurality of candidate line segments 121*a*, 121*b*, 122*a*, 122*b* and 124*b* at the intersection 131 is acquired in step S201, the transfer processor 68, in step S202, determines the line segment to which the peeling is going to be transferred next at the intersection 131. In this example, among the line segments which have the Out direction as the circulation direction and on which the peeling has not been performed yet among the candidate line segments 121*a*, 121*b*, 122*a*, 122*b* and 124*b*, a line segment having the smallest intersection angle is determined by the transfer processor 68 as the line segment to which the peeling is going to be transferred next. The line segment to which the peeling is going to be transferred next is also the line segment located on the outermost profile among the plurality of candidate line segments. In the target slice model 120 shown in FIG. 4, the line segment to which the peeling is going to be transferred next at the intersection 131 is the line segment 121*b*. In step S203, the peeling processor 64 sets the line segment 121*b* as the new peeling line segment, and resumes the peeling in the circulation direction of the peeling line segment 121*b*.

In the target slice model 120 shown in FIG. 4, the peeling is started from the line segment 121*b* of the contour 121. While being performed on the line segment 121*b*, the peeling reaches the intersection 132. At the intersection 132, the peeling is transferred from the line segment 121*b* to the line segment 122*c* of the contour 122. While being performed on the line segment 122*c*, the peeling reaches the intersection 133. At the intersection 133, the peeling is transferred from the line segment 122*c* to the line segment 123*a* of the contour 123. Then, the peeling reaches the intersection 133 again, and is transferred from the line segment 123*a* to the line segment 122*d*. The peeling reaches the intersection 134, and at the intersection 134, is transferred from the line segment 122*d* to the line segment 124*a*. Then, as described above, at the intersection 131, the peeling is transferred from the line segment 124*a* to the line segment 121*b*. Thus, the peeling on the contours is finished. In this example, the line segments on which the peeling is performed continuously is considered as one contour 151 (see FIG. 10).

Next, in step S107, it is determined whether or not there is a line segment (contour) on which the peeling has not been performed yet. In the case where there is a line segment on which the peeling has not been performed yet, namely, a line segment on which the peeling should be performed, the procedure returns to step S105, and the peeling line segment setting processor 62 sets the next line segment for the peeling to be started. In the above-described manner, steps S105 through S107 are repeated until the peeling is performed on all the line segments of all the contours. In the case where in step S107, there is no line segment without the peeling left, the procedure advances to step S108.

Figure 10:
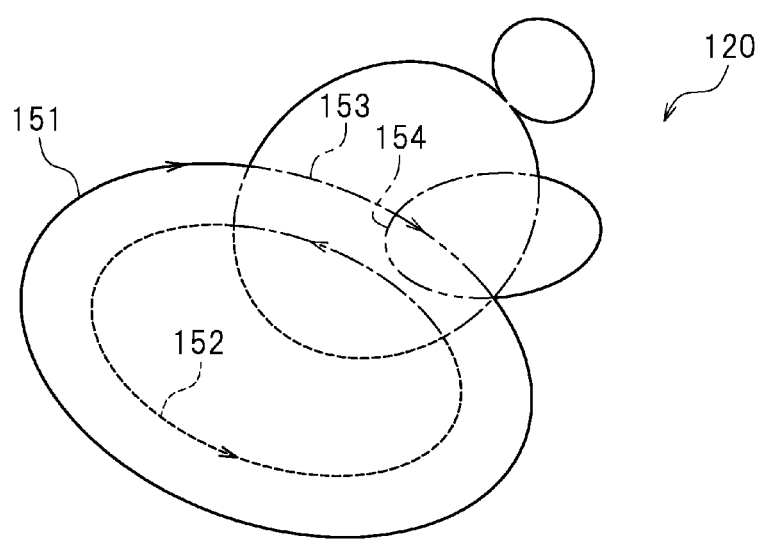
FIG. 10 shows a post-peeling target slice model.

FIG. 10 shows the post-peeling target slice model 120 (the target slice model 120 after the peeling is performed). As shown in FIG. 10, in the target slice model 120, the line segments on which the peeling has been performed continuously is considered as one generated contour. Four contours 151 through 154 in total are generated. In this example, the direction in which the peeling has been performed on each of the contours 151 through 154 becomes the circulation direction. The circulation direction of the contours 151, 153 and 154 are the clockwise direction, and thus the contours 151, 153 and 154 are island contours. By contrast, the circulation direction of the contour 152 is the counterclockwise direction, and thus the contour 152 is a hole contour. In this preferred embodiment, the contours 151 through 154 correspond to the "generated contours".

In step S108, a determination is made on the contours 151 through 154 obtained as a result of the peeling performed on the contours. In this example, the contour determination processor 70 determines whether or not each of the contours 151 through 154 is necessary. The contour determination processor 70 deletes the contour determined as being unnecessary. Specifically, the contour determination processor 70 determines, among the island contours, a contour that is enclosed by an outer contour at the closest position, as being unnecessary. In other words, in the case where, among the contours enclosing a target island contour, a contour enclosing the target island contour at the closest position is an island contour, the contour determination processor 70 determines the target island contour as being unnecessary. For example, in FIG. 10, the island contour 153 is enclosed by the island contour 151 at the closest position. Therefore, the island contour 153 is determined as being unnecessary. Similarly, the island contour 154 is enclosed by the island contour 153 at the closest position. Therefore, the island contour 154 is determined as being unnecessary. The island contour 151 is not enclosed by any island contour, and therefore is considered as a contour defining an outer profile of the target slice model 120. Therefore, the contour determination processor 70 determines the island contour 151 as being necessary. The contour 152 is a hole contour, and defines the shape of the hole. Therefore, the contour determination processor 70 determines the hole contour 152 as being necessary.

Figure 11:
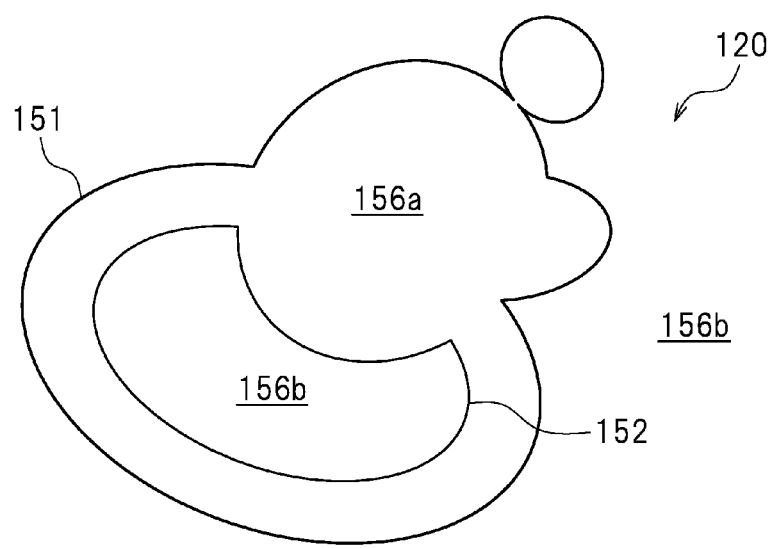
FIG. 11 shows a target slice model after unnecessary contours are deleted.

FIG. 11 shows the target slice model 120 after the unnecessary contours are deleted. In the above-described manner, as shown in FIG. 11, the contour determination processor 70 determines the island contours 153 and 154 as being unnecessary and deletes the island contours 153 and 154. By contrast, the contour determination processor 70 determines the island contour 151 and the hole contour 152 as being necessary. Therefore, the island contour 151 and the hole contour 152 are left without being removed.

Figure 12:
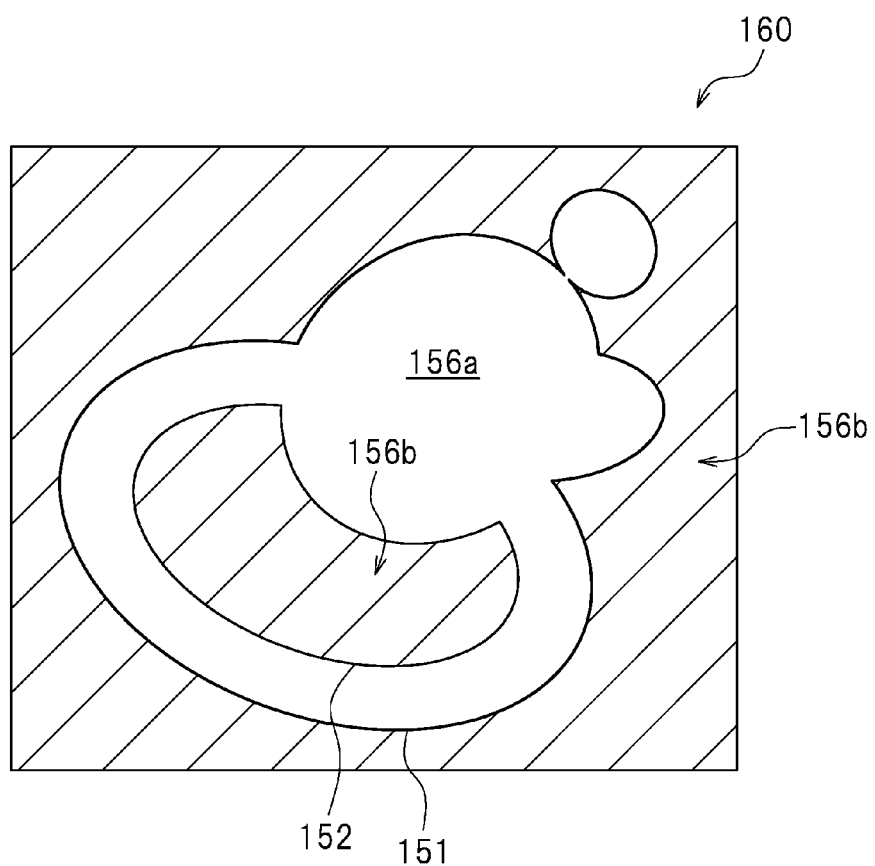
FIG. 12 shows a target slice image.
Figure 13A:
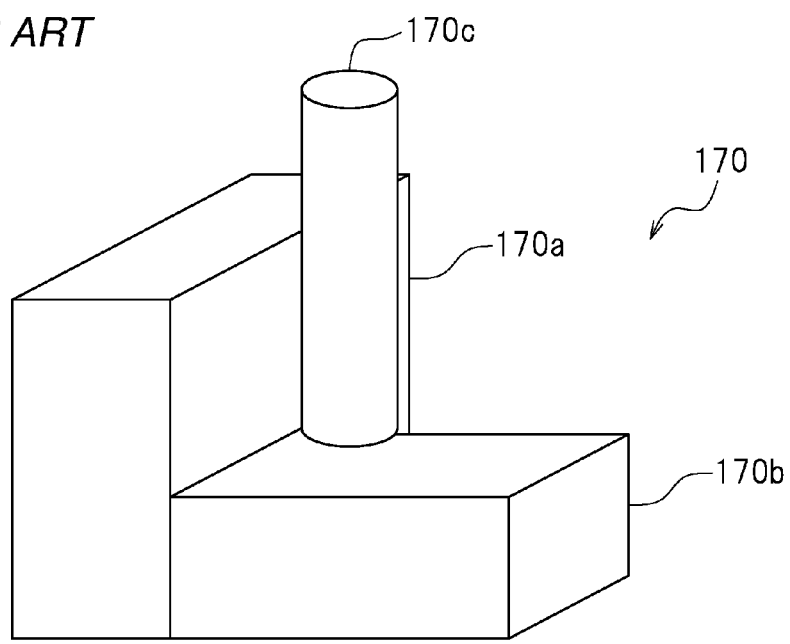
FIG. 13A is a perspective view of a whole object model by the conventional art.
Figure 13B:
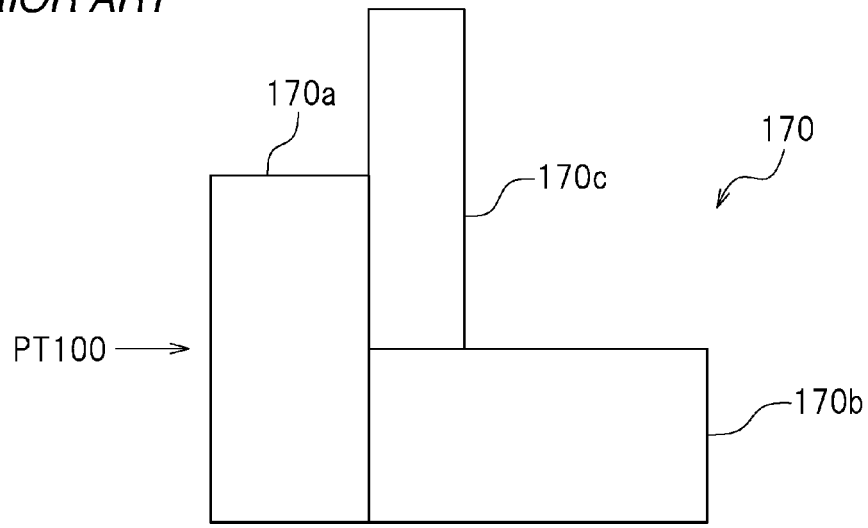
FIG. 13B is a side view of the whole object model by the conventional art.

Next, in step S109, the creation processor 72 creates the target slice image 160 (see FIG. 12). Specifically, the creation processor 72 divides the target slice model 120 shown in FIG. 11 into a printing region and a non-printing region. In this example, the creation processor 72 sets, among the regions enclosed by the island contour 151, a region excluding the region enclosed by the hole contour 152, as a printing region 156a. By contrast, the creation processor 72 sets the regions other than the printing region 156a, namely, the region enclosed by the hole contour 152 and the region not enclosed by the island contour 151a, as a non-printing region 156b. The creation processor 72 colors pixels in the printing region 156a white, and colors pixels in the non-printing region 156b black, to create the target slice image 160 shown in FIG. 12. In FIG. 12, the hatched region represents the region colored black.

The three-dimensional printing device 10A prints the target object conformed to the target slice image created as described above. For example, the target slice image 160 shown in FIG. 12 is used to print a cross-sectional shape corresponding to the target slice image 160. Specifically, a portion of the photocurable resin 23 located in a region corresponding to the white region, namely, the printing region 156a, is irradiated with light emitted from the projector 31, so that the portion of the photocurable resin 23 located in the region corresponding to the printing region 156a is cured. By contrast, a portion of the photocurable resin 23 located in a region corresponding to the black region, namely, the non-printing region 156b, is not irradiated with light emitted from the projector 31, so that nothing is printed in the region corresponding to the non-printing region 156b.

As described above, in this preferred embodiment, as shown in FIG. 5, when the peeling, while being performed on the peeling line segment 124a, reaches the intersection 131, at which the plurality of contours 121, 122 and 124 cross each other, the intersection information acquisition processor 66 acquires the angle information representing the intersection angles $\theta 1$ through $\theta 5$ respectively defined by the peeling line segment 124a and the plurality of candidate line segments 121a, 121b, 122a, 122b and 124b. The line segment to which the peeling is going to be transferred next at the intersection 131 from the peeling line segment 124a, is a line segment located closest to the peeling line segment 124a in a direction that is the same as the circulation direction of the peeling line segment 124a. In the case of the target slice model 120 shown in FIG. 5, the intersection angles $\theta 1$ through $\theta 5$ at the intersection 131 are acquired, and the candidate line segment 121b having the smallest intersection angle $\theta 1$ is set as the line segment to which the peeling is going to be transferred next. In this manner, even for the target slice model 120 including the intersection 131, at which the plurality of contours 121, 122 and 124 cross each other, the line segment to which the peeling is going to be transferred next at the intersection 131 is correctly determined. Therefore, the peeling on the contours is correctly performed for the target slice model 120, and thus the desired contours 151 and 152 are obtained as shown in FIG. 11. As a result, the desired target slice image 160 as shown in FIG. 12 is created.

In this preferred embodiment, as shown in FIG. 5, the intersection information acquisition processor 66 acquires the circulation direction information indicating whether the circulation direction of each of the candidate line segments 121a, 121b, 122a, 122b and 124b is the In direction approaching the intersection 131 or the Out direction separating from the intersection 131. Among the candidate line segments 121a, 121b, 122a, 122b and 124b, neither the line segment 121a nor the line segment 122a having the In direction as the circulation direction should be the line segment to which the peeling is going to be transferred next at the intersection 133 because the peeling would be performed in the opposite direction from the peeling on the line segment 124a. In the case where the line segment having the smallest intersection angle has the In direction as the circulation direction, such a line segment is deleted from the candidate line segments to which the peeling may be transferred. Therefore, the line segment to which the peeling is going to be transferred next at the intersection 133 is determined more correctly.

In this preferred embodiment, the intersection information acquisition processor 66 acquires the peeling information on each of the candidate line segments 121a, 121b, 122a, 122b and 124b. Among the candidate line segments 121a, 121b, 122a, 122b and 124b, the line segment on which the peeling has already been performed is not the line segment to which the peeling is going to be transferred next at the intersection 131. In the case where, for example, the peeling has already been performed on the line segment having the smallest intersection angle, such a line segment is deleted from the candidate line segments to which the peeling may be transferred. Therefore, the line segment to which the peeling is going to be transferred next at the intersection 133 is determined more correctly.

Figure 6B:
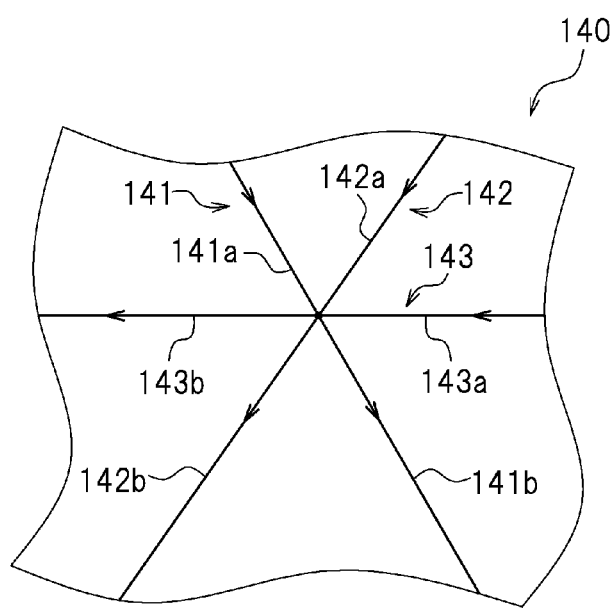
FIG. 6B shows that intersections located close to each other are integrated into one integrated intersection.

In the case where as shown in FIG. 6A, there are a plurality of intersections 145 through 147, at which the plurality of contours 141 through 143 cross each other and the distances between the intersections 145 through 147 are shorter than a predetermined distance, the computer program may make an erroneous recognition of the intersections, resulting in a failure of peeling on the contours. For example, the computer program may erroneously recognize that the peeling has reached the intersection 146 or 147 despite that the peeling has actually reached the intersection 145. However, in this preferred embodiment, as shown in FIG. 6B, the intersection process processor 60 integrates the plurality of intersections 145 through 147, having a distance therebetween shorter than the predetermined distance, into one integrated intersection 148. Therefore, the above-described erroneous recognition is prevented in advance.

In this preferred embodiment, the intersection process processor 60 sets the integrated intersection 148 at a position having an equal distance to the plurality of intersections 145 through 147 to be integrated. Then, the intersection process processor 60 deletes the plurality of intersections 145 through 147. Since the integrated intersection is located at the above-described position, the distance between the integrated intersection 148 and each of the intersections 145 through 147 to be integrated is made as short as possible. Therefore, the target slice image 160 close to the cross-sectional shape of the target object, which is the printing target, is created.

As described above, the processors of the slice image creation device 100, namely, the storage processor 52, the pre-process processor 54, the slice model creation processor 56, the circulation direction setting processor 58, the intersection process processor 60, the peeling line segment setting processor 62, the peeling processor 64, the intersection information acquisition processor 66, the transfer processor 68, the contour determination processor 70, and the creation processor 72 may be implemented by one processor included in the slice image creation device 100. Alternatively, these processors may be implemented by a plurality of processors. According to preferred embodiments of the present invention, the expression "is configured or programmed" encompasses executing a computer program stored on a computer. The preferred embodiments of the present invention encompass a non-transitory computer readable medium having the computer program stored thereon temporarily. The preferred embodiments of the present invention encompass a circuit having substantially the same function as that of the program to be executed by each of the processors. In this case, the storage processor 52, the pre-process processor 54, the slice model creation processor 56, the circulation direction setting processor 58, the intersection process processor 60, the peeling line segment setting processor 62, the peeling processor 64, the intersection information acquisition processor 66, the transfer processor 68, the contour determination processor 70, and the creation processor 72 may be respectively replaced with a storage circuit 52, a pre-process circuit 54, a slice model creation circuit 56, a circulation direction setting circuit 58, an intersection process circuit 60, a peeling line segment setting circuit 62, a peeling circuit 64, an intersection information acquisition circuit 66, a transfer circuit 68, a contour determination circuit 70, and a creation circuit 72.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A slice image creation device usable for a three-dimensional printing device that prints a target object as a printing target, the slice image creation device slicing a target object model, which is a three-dimensional model corresponding to the target object, at a predetermined interval to create a target slice model and creating a target slice image of the target slice model, the target slice model being defined by a plurality of contours including a plurality of line segments, the target slice model including an intersection at which at least two of the plurality of contours cross each other, the plurality of contours including an island contour representing a shape of an outer profile of the target object and a hole contour representing a shape of a hole in the target object, the slice image creation device comprising:

a circulation direction setting processor configured or programmed to set different circulation directions for the island contour and the hole contour;

a peeling line segment setting processor configured or programmed to set a peeling line segment that is one of the plurality of line segments of the plurality of contours of the target slice model on which peeling is to be performed, the peeling being performed to acquire a contour distinguishing a printing region corresponding to the target slice model to be printed by the three-dimensional printing device and a non-printing region not to be printed by the three-dimensional printing device;

a peeling processor configured or programmed to perform the peeling on the peeling line segment in the circulation direction of the peeling line segment;

an intersection information acquisition processor configured or programmed to, when the peeling reaches the intersection while being performed on the peeling line segment by the peeling processor, acquire intersection information including an intersection angle that is defined at the intersection by the peeling line segment and each of a plurality of candidate line segments, the intersection angle being defined by the peeling line segment in a direction that is the same as the circulation direction of the peeling line segment, the plurality of candidate line segments being included in the at least two of the plurality of contours crossing each other at the intersection;

a transfer processor configured or programmed to set one of the plurality of candidate line segments that has a smallest intersection angle, that distinguishes the printing region and the non-printing region from each other, and that is located at an outermost profile, as the line segment to which the peeling is going to be transferred next from the peeling line segment at the intersection, and to set the one of the plurality of candidate line segments as a new peeling line segment; and a creation processor configured or programmed to set the line segments on which the peeling has been performed continuously by the peeling processor as a generated contour, and to divide the target slice model into the printing region and the non-printing region based on the generated contour to create the target slice image.

2. The slice image creation device according to claim 1, wherein:

the intersection information includes circulation direction information indicating whether the circulation direction of each of the candidate line segments is an In direction approaching the intersection or an Out direction separating away from the intersection;

the intersection information acquisition processor acquires the circulation direction information on each of the candidate line segments; and the transfer processor sets one of the plurality of the candidate line segments having the Out direction as the circulation direction and the smallest intersection angle and being located on the outermost profile as the new peeling line segment.

3. The slice image creation device according to claim 1, wherein:

the intersection information includes peeling information indicating whether each of the candidate line segments is a peeled line segment on which the peeling has already been performed by the peeling processor or a non-peeled line segment on which the peeling has not been performed by the peeling processor;

the intersection information acquisition processor acquires the peeling information on each of the candidate line segments; and the transfer processor sets one of the candidate line segments, indicated by the peeling information as being a non-peeled line segment, which has the smallest intersection angle and is located on the outermost profile as the new peeling line segment.

4. The slice image creation device according to claim 1, wherein:

the target slice model includes a plurality of the intersections; and the slice image creation device further includes an intersection process processor configured or programmed to extract, from the plurality of intersections, a plurality of intersections having a distance therebetween shorter than a predetermined distance, and to integrate the extracted intersections into one integrated intersection.

5. The slice image creation device according to claim 4, wherein the intersection process processor is configured or programmed to set the integrated intersection at a position having an equal distance to the extracted intersections, and to delete the extracted intersections.

6. A three-dimensional printing system, comprising:
the three-dimensional printing device; and
the slice image creation device according to claim 1.

7. A slice image creation method usable for a three-dimensional printing device that prints a target object as a printing target, the slice image creation method comprising the steps of:

slicing a target object model, which is a three-dimensional model corresponding to the target object, at a predetermined interval to create a target slice model; and creating a target slice image of the target slice model; wherein the target slice model is defined by a plurality of contours including a plurality of line segments;

the target slice model includes an intersection at which at least two of the plurality of contours cross each other;

the plurality of contours include an island contour representing a shape of an outer profile of the target object and a hole contour representing a shape of a hole in the target object;

the slice image creation method further comprising:

a circulation direction setting step of setting different circulation directions for the island contour and the hole contour;

a peeling line segment setting step of setting a peeling line segment that is one of the plurality of line segments of the plurality of contours of the target slice model on which peeling is to be performed, the peeling being performed to acquire a contour distinguishing a printing region corresponding to the target slice model to be printed by the three-dimensional printing device and a non-printing region not to be printed by the three-dimensional printing device;

a peeling step of performing the peeling on the peeling line segment in the circulation direction of the peeling line segment;

an intersection information acquisition step of, when the peeling reaches the intersection while being performed on the peeling line segment in the peeling step, acquiring intersection information including an intersection angle that is defined at the intersection by the peeling line segment and each of a plurality of candidate line segments, the intersection angle being defined by the peeling line segment in a direction that is the same as the circulation direction of the peeling line segment, the plurality of candidate line segments being included in the at least two of the plurality of contours crossing each other at the intersection;

a transfer step of setting one of the plurality of candidate line segments that has a smallest intersection angle, that distinguishes the printing region and the non-printing region from each other, and that is located at an outermost profile, as the line segment to which the peeling is going to be transferred next from the peeling line segment at the intersection, and setting the one of the plurality of candidate line segments as a new peeling line segment; and a creation step of setting the line segments on which the peeling has been performed continuously in the peeling step as a generated contour, and dividing the target slice model into the printing region and the non-printing region based on the generated contour to create the target slice image.

8. The slice image creation method according to claim 7, wherein:
- the intersection information includes circulation direction information indicating whether the circulation direction of each of the candidate line segments is an In direction approaching the intersection or an Out direction separating away from the intersection;
- in the intersection information acquisition step, the circulation direction information is acquired on each of the candidate line segments; and
- in the transfer step, one of the plurality of candidate line segments having the Out direction as the circulation direction and the smallest intersection angle and is located on the outermost profile, is set as the new peeling line segment.

9. The slice image creation method according to claim 7, wherein:
- the intersection information includes peeling information indicating whether each of the candidate line segments is a peeled line segment on which the peeling has already been performed in the peeling step or a non-peeled line segment on which the peeling has not been performed in the peeling step;
- in the intersection information acquisition step, the peeling information on is acquired each of the candidate line segments; and
- in the transfer step, one of the candidate line segments indicated by the peeling information as being a non-peeled line segment, that has the smallest intersection angle and that is located on the outermost profile, is set as the new peeling line segment.

10. The slice image creation method according to claim 7, wherein:
- the target slice model includes a plurality of the intersections; and
- the slice image creation method further includes an intersection process step of extracting, from the plurality of intersections, a plurality of intersections having a distance therebetween shorter than a predetermined distance, and integrating the extracted intersections into one integrated intersection.

11. The slice image creation method according to claim 10, wherein in the intersection process step, the integrated intersection is set at a position having an equal distance to the extracted intersections, and the extracted intersections are deleted.

* * * * *